US010083315B2

United States Patent
Lee

(10) Patent No.: US 10,083,315 B2
(45) Date of Patent: Sep. 25, 2018

(54) PRIVACY ENHANCED PERSONAL SEARCH INDEX

(71) Applicant: Microsoft Technology Licensing, LLC, Redmond, WA (US)

(72) Inventor: Ho John Lee, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/753,225

(22) Filed: Jun. 29, 2015

(65) Prior Publication Data

US 2016/0379009 A1  Dec. 29, 2016

(51) Int. Cl.
*G06F 21/00* (2013.01)
*G06F 21/62* (2013.01)
*G06F 17/30* (2006.01)

(52) U.S. Cl.
CPC ......... *G06F 21/6227* (2013.01); *G06F 17/30* (2013.01); *G06F 17/30011* (2013.01); *G06F 17/30321* (2013.01); *G06F 17/30864* (2013.01); *G06F 21/6245* (2013.01)

(58) Field of Classification Search
CPC .......... G06F 21/6227; G06F 17/30091; G06F 17/30675; G06F 21/6245; G06F 17/30; G06F 17/30011; G06F 17/30321; H04L 63/0428
USPC ....................................................... 713/164
See application file for complete search history.

(56) References Cited

U.S. PATENT DOCUMENTS

| | | | |
|---|---|---|---|
| 9,342,705 B1 * | 5/2016 | Schneider | H04L 9/14 |
| 9,454,673 B1 * | 9/2016 | Sarukkai | G06F 21/6209 |
| 2001/0052074 A1 * | 12/2001 | Pensak | H04L 63/0428 713/167 |
| 2003/0177124 A1 * | 9/2003 | Sauri | G06F 17/30011 |
| 2006/0101285 A1 | 5/2006 | Chen et al. | |
| 2009/0204579 A1 * | 8/2009 | Govani | G06F 17/30864 |
| 2011/0004607 A1 * | 1/2011 | Lokam | G06F 17/30675 707/759 |
| 2012/0131009 A1 | 5/2012 | Nath et al. | |
| 2013/0054554 A1 | 2/2013 | Cao et al. | |
| 2013/0254539 A1 | 9/2013 | Auradkar et al. | |
| 2014/0082749 A1 | 3/2014 | Holland et al. | |
| 2015/0012495 A1 | 1/2015 | Prahlad et al. | |

OTHER PUBLICATIONS

Liu, Chang, et al. "Fuzzy keyword search on encrypted cloud storage data with small index." Cloud Computing and Intelligence Systems (CCIS), 2011 IEEE International Conference on. IEEE, 2011.*

(Continued)

*Primary Examiner* — Syed Zaidi

(57) ABSTRACT

Examples of the present disclosure describe systems and methods for enhancing the privacy of a personal search index. In some aspects, a personal cleartext document may be used to generate an encrypted document digest and an encrypted document on a first device. A second device may decrypt the document digest, build a personal search index based on the decrypted document digest, and store the encrypted document in a data store. The first device may subsequently receive a cleartext search query that is used to query the personal search index on the second device for encrypted documents.

19 Claims, 12 Drawing Sheets

(56) References Cited

OTHER PUBLICATIONS

Liu, Dongxi, and Shenlu Wang. "Programmable order-preserving secure index for encrypted database query." Cloud Computing (CLOUD), 2012 IEEE 5th International Conference on. IEEE, 2012.*

PCT International Search Report and Written Opinion in PCT/US2016/039188, dated Sep. 28, 2016, 10 pages.

* cited by examiner

PRIVACY ENHANCED PERSONAL SEARCH INDEX

BACKGROUND

Cloud storage systems are file hosting services that allow users to upload and synchronize files to one or more storage devices, and to subsequently access the files from a web browser or the user's local device. Performing searches for files within a cloud storage system implicates several privacy concerns, as documents, document indexes and metadata are accessible as cleartext to the cloud storage system service provider. Although various technologies and approaches have evolved to address these privacy concerns, these solutions have relied on providing documents in cleartext to the cloud storage system. As a result, if the cloud storage system is breached, all users using the service to store data are potentially at risk.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for enhancing the privacy of a personal search index. In some aspects, a personal cleartext document is created on a first device (e.g., a client device) that is in communication with a second device (e.g., a server device). The second device may be part of a distributed network (e.g., utilizing a cloud-based service provider). The personal cleartext document may be used to generate an encrypted document digest and an encrypted document on the first device. The encrypted document digest and encrypted document may then be transmitted to the second device. The second device may decrypt the document digest, build a personal search index based on the decrypted document digest, and store the encrypted document in at least one data store. The first device may subsequently receive a cleartext search query. The search query may be used to generate an opaque search query digest, which is transmitted to the second device. The second device may use the opaque search query digest to search the personal search index in order to provide opaque search query results. The opaque search query results may be used to retrieve encrypted documents from the data store. The opaque search query results and the retrieved encrypted documents may then be transmitted to the client device. The client device may use the opaque search query results and the retrieved encrypted document to generate cleartext search results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
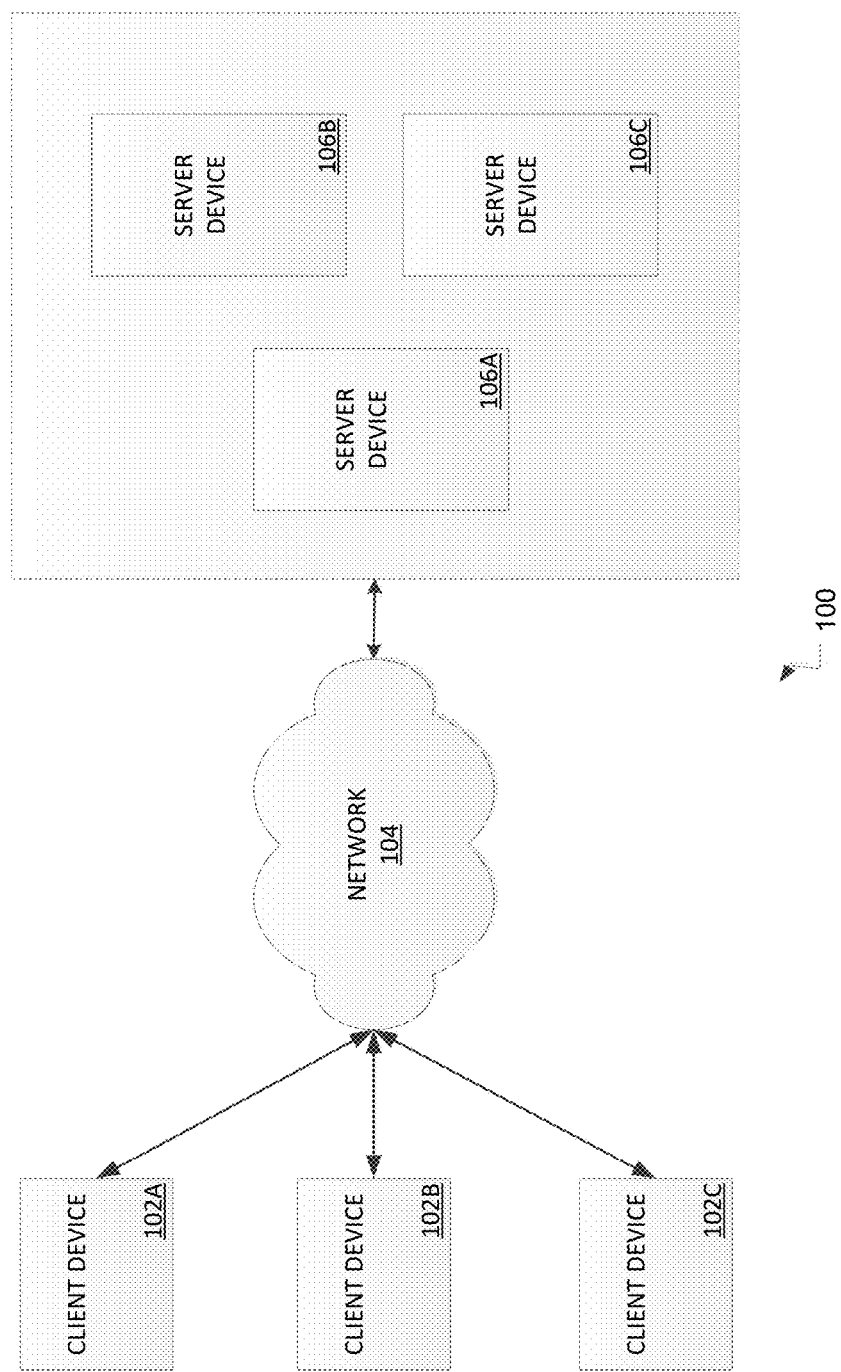
FIG. 1 illustrates an overview of an example system for a privacy enhanced personal search index for cloud services as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for enhancing the privacy of a personal search index for distributed network services, such as cloud services. A personal search, as used herein, may refer to a search of non-public data (e.g., a document, audio file, video file, etc.) that is only accessible by the user that created and/or stored the data or a small group of privileged users. In aspects, the methods may be practiced in a distributed computing environment comprising a trusted client environment and a partially trusted environment. A trusted client environment, as used herein, may refer to a secure area on a first processing device (such as a client device) that provides for the protected loading and execution of code and data. A partially trusted environment, as used herein, may refer to an unsecure area on a second device (e.g., a server device) that does not allow the loading and execution of code and data, or that imposes security constraints before allowing the loading and execution of code and data.

In some examples, cleartext data (e.g., a cleartext document) may be created on a client device. A cleartext document, as used herein, may refer to human-readable data that is transmitted and/or stored in an unencrypted format. The cleartext document may be used by the client device to generate a document digest, convert the document digest to an opaque document digest, encrypt the opaque document digest, generate document snippets, and encrypt document and document snippets. A document digest, as used herein, may refer to a compilation of terms from, and metadata describing, a document. In some examples, the terms and metadata of the document digest may be tokenized. An opaque document, as used herein, may refer to a cleartext or other human readable document for which the data has been converted into a human-unreadable format using data transformation techniques. A document snippet, as used herein, may comprise a brief summary of a document, metadata, and/or one or more sentences from the document. The encrypted opaque document digest and the encrypt document and document snippets may then be transmitted to a server device.

In examples, the second device (e.g., server device) may decrypt the encrypted opaque document digest and use the decrypted opaque document digest to build a personal search index. A personal search index, as used herein, may collect, parse and store document digest data in an index to facilitate expeditious and accurate information retrieval. The server device may also store the encrypted document and document snippets in a data store using a storage management utility. A storage management utility, as used herein, may refer to devices, processes, and software used to manage storage devices and storage network solutions.

In some aspects, the client device may subsequently receive a cleartext search query. The cleartext search query may be used by the client device to generate a query digest and convert the query digest to an opaque query digest. A query digest, as used herein, may refer to a compilation of terms from, and metadata describing, a search query. The opaque query digest may then be transmitted to a server device. After receiving the opaque query digest, the server device may use the opaque query digest to search the personal search index in order to generate ranked query results. Ranked query results, as used herein, may refer to a set of opaque results that are ordered and/or prioritized according to at least one of several criteria, such as relevance, document age, document size, user profile information, etc. The ranked query results may be used to retrieve encrypted documents and/or document snippets from the data store. The encrypted documents and/or document snippets may then be transmitted to the client device. The client device may decrypt the received encrypted documents and/or document snippets and combine the ranked query results and the documents and/or document snippets. The client device may perform content-based ranking on the combined ranked query results and the documents and/or document snippets to generate ranked cleartext search results.

Accordingly, aspects of the present disclosure provides a plurality of benefits including but not limited to: enhancing personal document security, eliminating the transfer of cleartext user information, queries, and search results to cloud services; eliminating the requirement for all data stored using cloud services to reside in a single trust boundary; minimizing the transfer of user keys to the cloud services; reducing the security measures required by cloud services; the graceful retrofit of privacy enhanced personal indexes to older search services, among other examples.

FIG. 1 illustrates an overview of an example system for a privacy enhanced personal search index for cloud services as described herein. Exemplary system 100 may be a combination of interdependent components that interact to form an integrated whole for improving recommendations from implicit feedback. Components of the systems may be hardware components or software implemented on and/or executed by hardware components of the systems. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the exemplary operating environments depicted in FIGS. 9-11. In other examples, the components of systems disclosed herein may be spread across multiple devices. For instance, input may be entered on a client device (e.g., processing device) and information may be processed or accessed from other devices in a network such as one or more server devices.

As one example, the system 100 comprises client device 102A, client device 102B, client device 102C, distributed network 104, and a distributed network environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of the distributed network.

The client computing devices 102A, for example, may be a trusted environment configured to generate and/or receive one or more cleartext personal documents, and to use the cleartext personal documents to generate an encrypted opaque document digest and an encrypted personal document. Client computing device 102A may then transmit the encrypted opaque document digest and an encrypted personal document to one or more of servers 106A, 106B and 106C via network 104. Server 106A, for example, may be configured to receive the encrypted opaque document digest and encrypted personal document, decrypt the opaque document digest, generate a personal search index using the decrypted opaque document digest, and store the encrypted personal document in a personal document data store. Server 106A may be an untrusted environment or a partially trusted environment, and may provide a service hosted by a cloud services provider.

Client computing device 102A may be further configured to receive a cleartext search query request, generate an opaque query digest, and transfer the opaque query digest to one or more of servers 106A, 106B and 106C via network 104. Server 106A, for example, may be further configured to receive the opaque query digest, search the personal search index using the opaque query digest, generate ranked query results and retrieve encrypted documents using the ranked query results. Server 106A may then transmit the ranked query results and retrieved encrypted documents to client computing device 102A via network 104. Client computing device 102A may be further configured to receive the ranked query results and encrypted documents, decrypt the encrypted documents, generate ranked cleartext search results, and display the ranked cleartext search results on a display area of client computing device 102A.

Figures 2A, 2B:
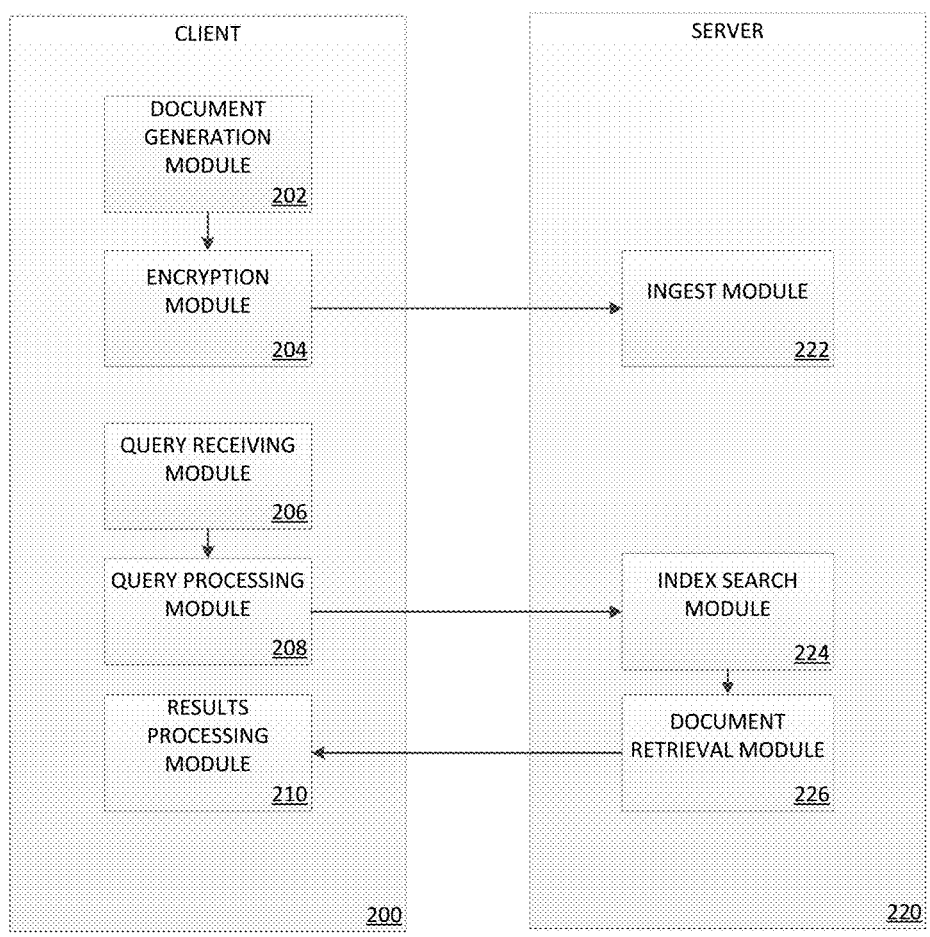
FIGS. 2A and 2B are diagrams of a client computing device and server, respectively, as described herein.

FIGS. 2A and 2B are exemplary diagrams of a client computing device 200 and a server computing device 220, respectively, as described herein. The client computing device 200 may comprise a document generation module 202, an encryption module 204, a query receiving module 206, a query processing module 208, and a results processing module 210, each having one or more additional components. The document generation module 202 may be configured to generate and/or receive one or more personal documents. For example, document generation module 202 may comprise or interface with a word processing application. The word processing application may be used to generate a cleartext text-based document. The encryption module 204 may be configured to receive and encrypt the one or more personal documents. In some aspects, encryption module 204 performs operations along one or more processing paths. For example, encryption module 204 may perform operations along a document understanding pipeline path and a document encryption path.

In examples, the document understanding pipeline path may include using a received personal document to generate a cleartext document digest of terms included within the personal document and metadata describing the personal document. A private transform key (PTK) may be applied to the cleartext document digest to generate an opaque document digest. A PTK, as used herein, may refer to a key or algorithm that uses data transformation techniques to convert a set of data values from a first data format of a source into a second data format. In some aspects, the data transformation techniques preserve the structure of the personal document (e.g., isometric transform), such that approximate term matching, relative term frequency, and certain distance metrics are preserved within the opaque document digest. A private index key (PIK) may be applied to the opaque document digest to generate an encrypted opaque document digest. A PIK, as used herein, may refer to a value provided by a designated authority as an encryption key to secure the contents of a personal document. The PIK may be generated using any known methods of asymmetric cryptography (e.g., public key encryption) or symmetric cryptography (e.g., cipher-based encryption). The encrypted opaque document digest and the PIK may then be processed for export to a server device 220, thereby concluding the document understanding pipeline path.

In examples, the document encryption path may include generating document snippets using the cleartext personal document. A private document key (PDK) may be applied to the cleartext personal document and/or the document snippets to generate an encrypted personal document comprising the encrypted personal document and/or the encrypted document snippets. A PDK, as used herein, may refer to a value provided by a designated authority as an encryption key to secure the contents of a personal document. The PDK may be generated using any known methods of asymmetric cryptography (e.g., public key encryption) or symmetric cryptography (e.g., cipher-based encryption). In at least one example, the PDK will be different from the PTK and the PIK. The encrypted personal document may then be processed for export to a server device 220, thereby concluding the document encryption path.

The query receiving module 206 may be configured to receive or generate a cleartext query for one or more personal documents. For example, query receiving module 206 may comprise or interface with a user interface. The user interface that provide an input area for submitting a query. The query processing module 208 may be configured to generate a cleartext query digest of terms and metadata using the cleartext query. A PTK may be applied to the cleartext query digest to generate an opaque query digest. In some aspects, the PTK applied to the cleartext query digest may be the same PTK applied to the cleartext document digest. The opaque query digest may then be processed for export to a server device 220.

The results processing module 210 may be configured to receive and process opaque ranked query results and encrypted personal documents. For example, results processing module 210 may apply a PTK to the opaque ranked query results to produce cleartext ranked query results. In some aspects, the PTK applied to the opaque ranked query results may be the same PTK applied to the cleartext document digest and the cleartext query digest. Results processing module 210 may also apply a PDK to an encrypted personal document to produce a cleartext document and/or cleartext document snippets. In some aspects, the PDK applied to the encrypted personal document may be the same PDK applied to the cleartext personal document and/or the document snippets. The cleartext ranked query results and cleartext personal document and/or the document snippets may then be combined into ranked cleartext search results. In one example, the ranked cleartext search results may be ranked according to one or more criteria, such as content, relevance, size or date.

The server device 220 may comprise an ingest module 222, an index search module 224, and a document retrieval module 206, each having one or more additional components. The ingest module 222 may be configured to receive and process information from encryption module 204, such as an encrypted opaque document digest, a PIK, and an encrypted personal document. In some aspects, ingest module 222 performs operations along one or more processing paths. For example, ingest module 222 may perform operations along a document indexing path and a document storage path.

In examples, the document indexing path may include applying the received PIK to the received encrypted opaque document digest to decrypt the encrypted opaque document digest. In some aspects, the resulting opaque document digest may be aggregated with other opaque document digests that have previously been received from the client device 200 to form an opaque document digest collection. An index generating operation may be executed on the opaque document digest or the opaque document digest collection to build a personal search index. The personal search index may include opaque word indexes from sentences, sequences of alphanumeric characters, or tokens within the opaque document digest.

The document storage path may include ingest module 222 interacting with a storage management utility. For example, ingest module 222 may use a storage management service running on the server device 220 to store the encrypted personal document in a data store. In some aspects, the storage management service and the data store may be located on server device 220. In other aspects, one or more of the storage management service and the data store may be located on a separate server that is accessible by server device 220.

Index search module 224 may be configured to receive and process information from query processing module 208, such as an opaque query digest. For example, index search module 224 may use a received opaque query digest to search a personal search index comprising opaque word indexes. The search of the personal search index may produce ranked query results of the top search results found. In some aspects, the ranked query results may comprise an ordered list of opaque search results and opaque document snippets. In such aspects, the opaque search results and opaque document snippets may then be processed for export to a client device 220.

In other aspects, the ranked query results may comprise an ordered list of opaque search results, but may not comprise opaque document snippets. In such aspects, document retrieval module 226 may be configured to retrieve encrypted personal documents from a data store. For example, the opaque search results may be provided to a storage management utility. The storage management utility may search a data store for encrypted documents and/or document snippets having data (e.g., strings, words, characters, tokens, etc.) that matches the data in the opaque search results. The encrypted documents and/or document snippets retrieved from the data store may then be processed for export to a client device 220.

FIG. 3-8 illustrate various process flows associated with a privacy enhanced personal search index for cloud services as described herein. In aspects, methods 300-800 may be executed by an exemplary system such as system 100 of FIG. 1. In examples, methods 300-800 may be executed on a device comprising at least one processor configured to store and execute operations, programs or instructions. However, methods 300-800 are not limited to such examples. In other examples, methods 300-800 may be performed on an application or service for providing recommendations. In at least one example, methods 300-800 may be executed (e.g., computer-implemented operations) by one or more components of a distributed network, for instance, web service/distributed network service (e.g. cloud service) to leverage index search and generation and encrypted document processing.

Figure 3:
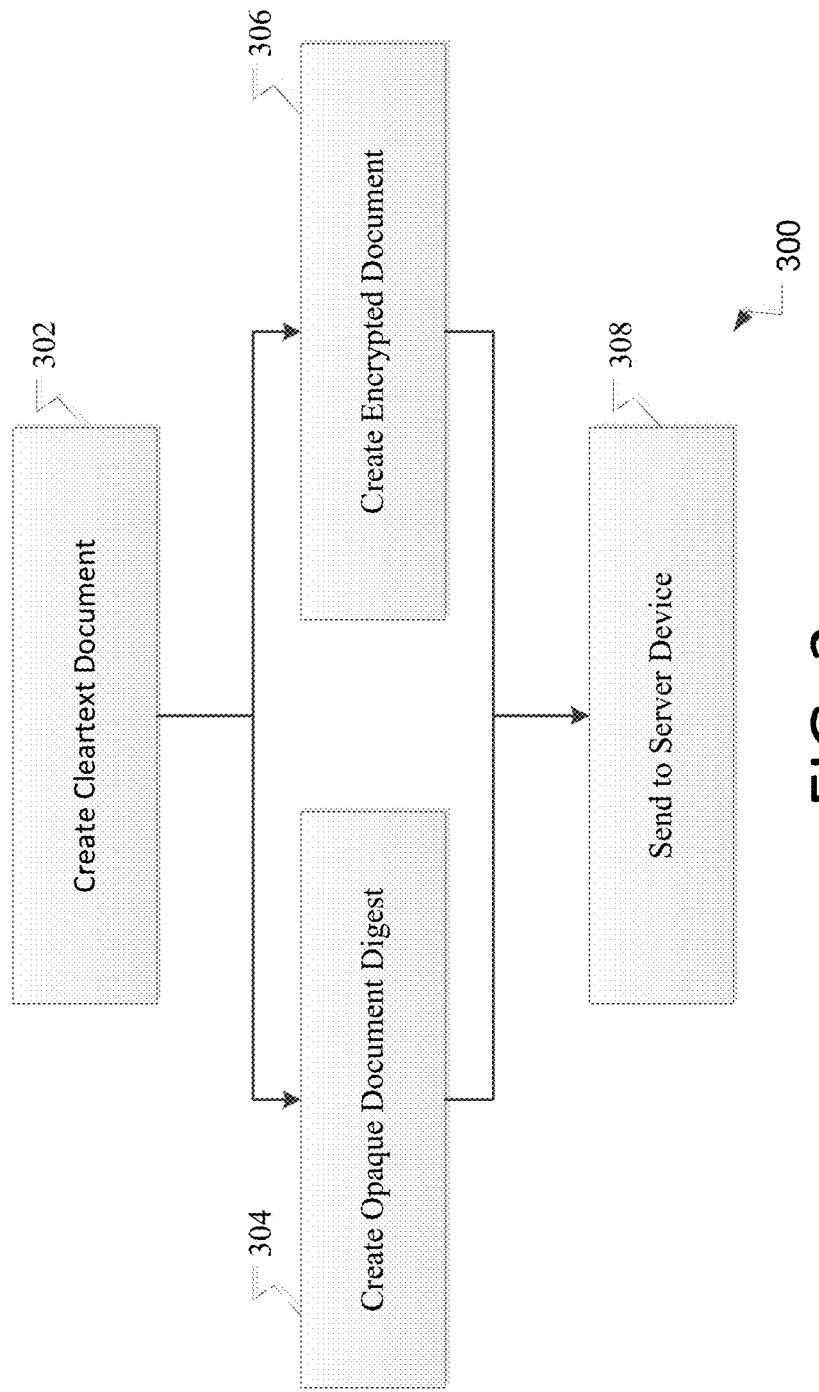
FIG. 3 illustrates an example method of processing a document for use with a privacy enhanced personal search index for cloud services as described herein.

FIG. 3 illustrates an example method of processing a document for use with a privacy enhanced personal search index for cloud services as described herein. Exemplary method 300 begins at operation 302 where a document may be generated. In some aspects, the document is a cleartext personal document that is created or received using an application on a client device. In one example, the client device may represent a trusted environment, such that the document may be accessible only to the document's author or a group of privileged users. However, one skilled in the art will recognize that operations described herein may be applicable to trusted environments, partially-trusted environments, and untrusted environments. The client device may generate one or more privacy keys (e.g., PTK, PIK, and PDK) before or after receiving the cleartext personal document. The client device may alternately receive one or more privacy keys from a trusted third-party certification authority.

In operation 304, an opaque document digest may be created. In examples, the cleartext personal document is provided to a process that performs document understanding operations. In some aspects, the process follows a path, such as a document understanding path. Document understanding, as used herein, may refer to the semantic analysis of documents to extract human understandable information and codify the information into machine-readable form. The document understanding operations may comprise generating a cleartext document digest of terms and metadata using the cleartext personal document, applying a PTK to the cleartext document digest to generate an opaque document digest, and applying a PIK to the opaque document digest to generate an encrypted opaque document digest.

In operation 306, an encrypted personal document may be created. In examples, the cleartext personal document is provided to a process that performs document encryption operations. The document encryption operations may comprise generating cleartext document snippets from the cleartext personal document and applying a PDK to the cleartext personal document and/or cleartext document snippets to generate an encrypted personal document. Operations 304 and 306 may be performed sequentially or in parallel.

In operation 308, the encrypted opaque document digest, the PIK used to encrypt the opaque document digest, and the encrypted personal document are transmitted from the trusted environment of the client device to the partially trusted environment of the server device. In aspects, the PTK and PDK remain within the client device. Further, no cleartext (e.g., documents, digests, queries, etc.) is transmitted to the server device.

Figures 4A, 4B:
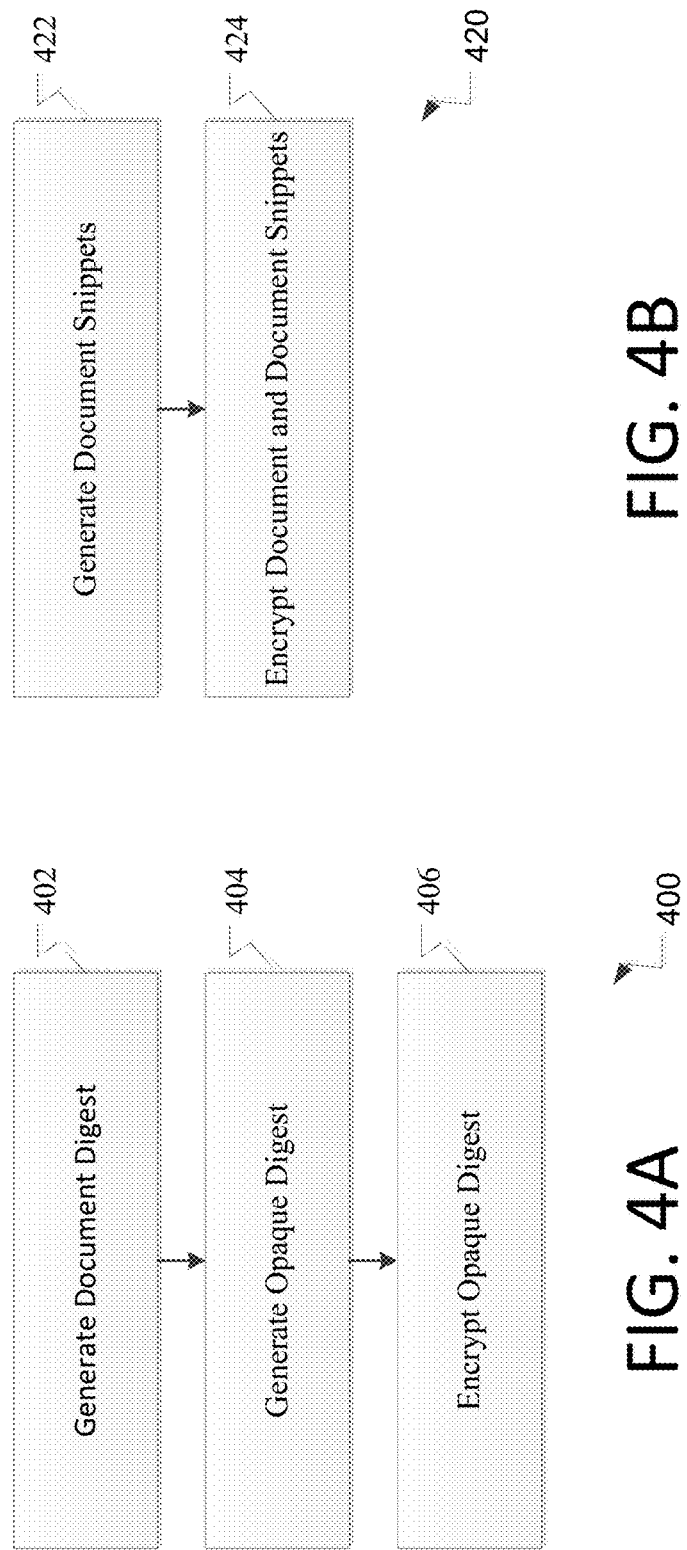
FIG. 4A illustrates an example method of creating an encrypted opaque document digest as described herein.
FIG. 4B illustrates an example method of creating an encrypted document and document snippets as described herein.

FIG. 4A illustrates an example method 400 of creating an encrypted opaque document digest as described herein. Exemplary method 400 begins at operation 402 where a cleartext document digest may be generated using a cleartext personal document. In some aspects, generating the cleartext document digest includes parsing the cleartext personal document into a plurality of cleartext index terms and associated cleartext metadata. The parsing operation may be performed by software located on the client device that generated or received the cleartext personal document or by software located within another trusted environment. The cleartext index terms and metadata may be combined and/or organized into a digest file.

In operation 404, an opaque document digest may be generated from the cleartext personal document. In examples, a PTK may be generated or received by a client device. The PTK may be operable to perform data translation operations on a set of data values. The data translation operations may include mapping data elements or values from a source data format to a destination data format, logging any transformations that may occur, generating code that performs the logged transformations, and executing the transformation code. In one particular example, executing the transformation code may include creating tokens representing the data elements from the source data format. In some aspects, any document digest to which the PTK is applied will share a common data transformation, such that basic term frequency-inverse document frequency (TF-IDF) rankings are preserved for a file (e.g., document digest, query digest). TF-IDF, as used herein, may refer to a numerical statistic or weighting factor that is intended to reflect the importance of a word in a document or a collection of documents. The PTK may be applied to the cleartext personal document to generate an opaque document digest. In aspects, the PTK may not be transmitted from the client device.

In operation 406, an encrypted opaque document digest may be generated from the opaque document digest. In examples, a PIK may be generated or received by a processing device such as client device. The PIK may be operable to perform encryption operations on one or more documents. The encryption operations generally include converting ordinary information (e.g., plaintext) into human-unreadable text (e.g., ciphertext). Methods for encrypting files and documents are well-known to those skilled in the art and will not be described in detail in this disclosure. The PIK may be applied to the opaque document digest to generate an encrypted opaque document digest. In some aspects, the PIK may be transmitted along with the encrypted opaque document digest to one or more untrusted or partially trusted server devices. Encrypting the opaque document digest may prevent statistical attacks based on bulk access to the opaque terms and metadata.

FIG. 4B illustrates an example method 420 of creating an encrypted document and document snippets as described herein. Exemplary method 420 begins at operation 422 where cleartext document snippets may be generated using a cleartext personal document. In examples, document snippets may be files that are created by analyzing the cleartext personal document and extracting various sections, character strings, and/or metadata. In one particular aspect, a document snippet may comprise a document title, a brief description of the document, the name of the document's author, the first three sentences of the document, the document type, a preview image of the document, etc.

In operation 424, an encrypted personal document may be generated. In some examples, a PDK may be generated or received by a client device. The PDK may be operable to perform encryption operations on one or more documents. The encryption operations generally include converting ordinary information into human-unreadable text (e.g., ciphertext). The PDK may be applied to the cleartext personal document and/or the document snippets to generate an encrypted personal document. In aspects, the PDK may not be transmitted from the client device. In examples, although the PDK and PIK may share similarities (e.g., encryption-based keys) and the PDK and PTK may share similarities (e.g., keys are not transmitted from the client device), the PTK, PIK and PDK are separate and/or distinct keys.

Figure 5:
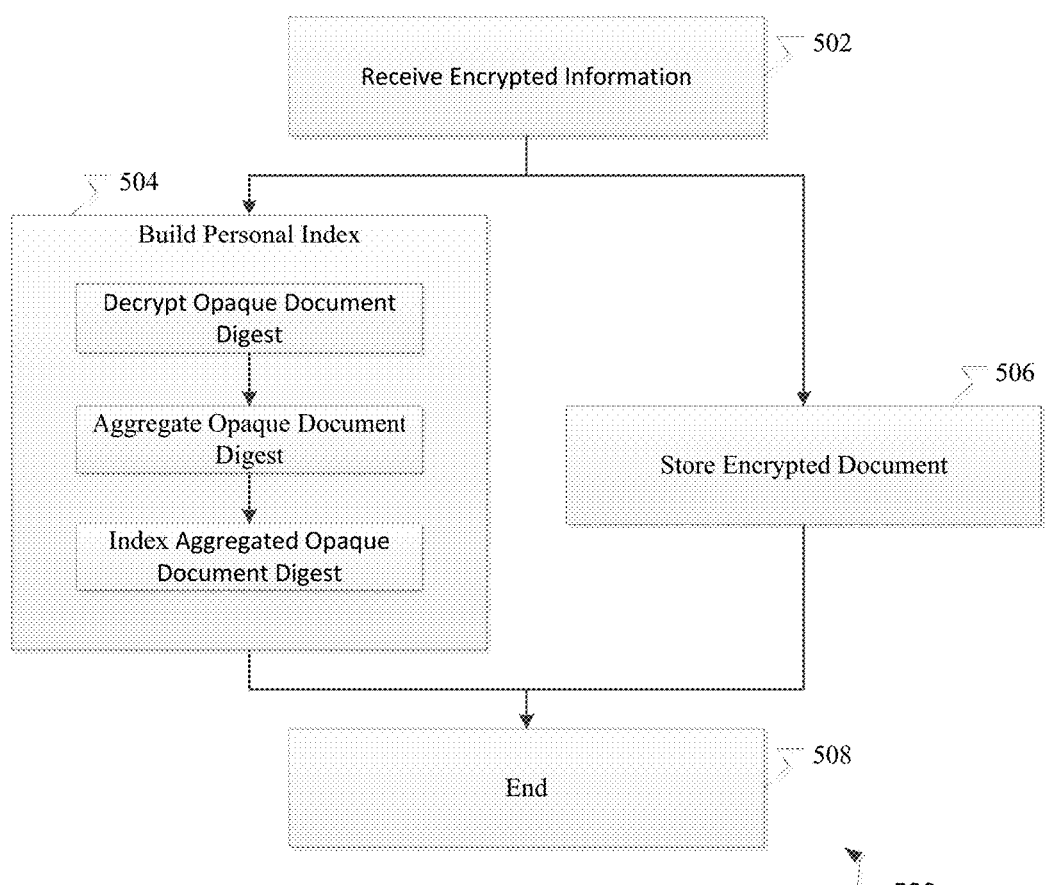
FIG. 5 illustrates an example method of building the privacy enhanced personal search index for distributed network services as described herein.

FIG. 5 illustrates an example method 500 of building a privacy enhanced personal search index for distributed network services as described herein. Exemplary method 500 begins at operation 502 where an encrypted document, an encrypted opaque document digest, and a PIK may be received by a component of a server device of a cloud services system. The server device may represent an untrusted or partially environment, such that the document may not be accessible by the server device or users of the server device. The encrypted document may comprise an encrypted personal document and encrypted document snippets.

In operation 504, a personal search index may be created. In examples, an encrypted opaque document digest and a PIK used to encrypt the encrypted opaque document digest may be provided to a process that facilitates document indexing. Document indexing, as used herein, may refer to classifying a document by terms or symbols in order to describe and/or summarize the subject of the document. The process may comprise decrypting the encrypted opaque document digest using the PIK and, optionally, aggregating the decrypted opaque document digest with other opaque document digests to generate an opaque document digest collection. In some aspects, the other opaque document digests may have been previously received from a client device. For example, the other opaque document digests may be associated with a particular user or user account on the client device. In other aspects, the other opaque document digests may have been previously received from various client devices associated with a particular user, user account, or a group account. The process may further comprise indexing the opaque document digest collection to create opaque terms and/or symbols. The opaque terms and/or symbols may then be used to build a personal search index. In some aspects, the personal search index may comprise only information associated with a particular client device or information associated with a particular user account. Operation 504 proceeds to end operation 508.

At operation 506, the received encrypted document may be stored. In examples, the server device may be in communication with a storage management utility. The storage management utility may facilitate storing the encrypted document in one or more data stores. In aspects, the storage management utility may be located on the server device, on another component of the cloud services system, or on a computing device accessible by the cloud services system. The data store may be co-located with the storage management utility, located separately from the storage management utility, or distributed among various server devices. In at least one example, the data store may be a personal document storage space that is accessible only be the document author, a group of privileged viewers, or a group of privileged users of the server device. Operation 506 proceeds to end operation 508.

Figure 6:
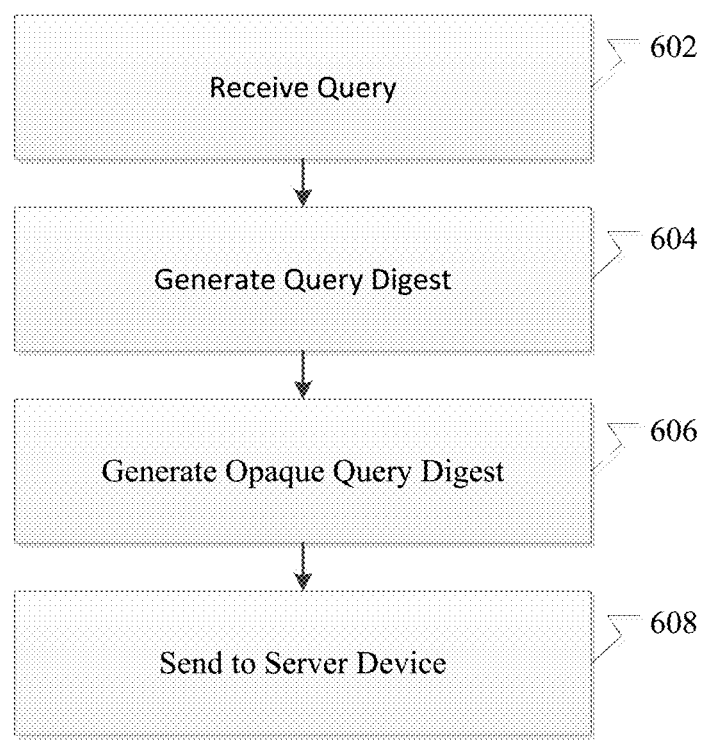
FIG. 6 illustrates an example method of processing a query for encrypted documents for use with a privacy enhanced personal search index for distributed network services as described herein.

FIG. 6 illustrates an example method 600 of processing a query for encrypted documents for use with a privacy enhanced personal search index for distributed network services as described herein. Exemplary method 600 begins at operation 602 where a client device may receive or generate a search query for documents stored by cloud services on a server device. In aspects, the query may be received or generated in cleartext or plain text. In one particular aspect, the query is generated on a client device that is different from the client device used to transmit the searched-for document to the server device.

In operation 604, a cleartext query digest may be generated using the cleartext query. In aspects, the cleartext query may be analyzed and parsed to extract cleartext query terms and/or metadata. The analysis and parsing operations may be performed by software located on the client device or by software located within another trusted environment. The cleartext query terms and metadata may be combined and/or organized into a digest file, such as a cleartext query digest file.

In operation 606, an opaque query digest may be generated. In examples, a PTK may be generated or received by a client device. The PTK may be operable to perform data translation operations on a set of data values, as discussed above with respect to FIG. 4. The PTK may be applied to the cleartext query document to generate an opaque query digest. In some aspects, the PTK applied to the cleartext query digest may be the same PTK applied to the cleartext document digest of one or more of the searched-for documents.

In operation 608, the encrypted opaque query digest is transmitted from the trusted environment of the client device to the partially trusted or untrusted environment of the server device. In aspects, the PTK used to encrypt the opaque query digest may remain within the client device. In such aspects, no cleartext information from the client device may be transmitted or exposed to the server device being queried.

Figure 7:
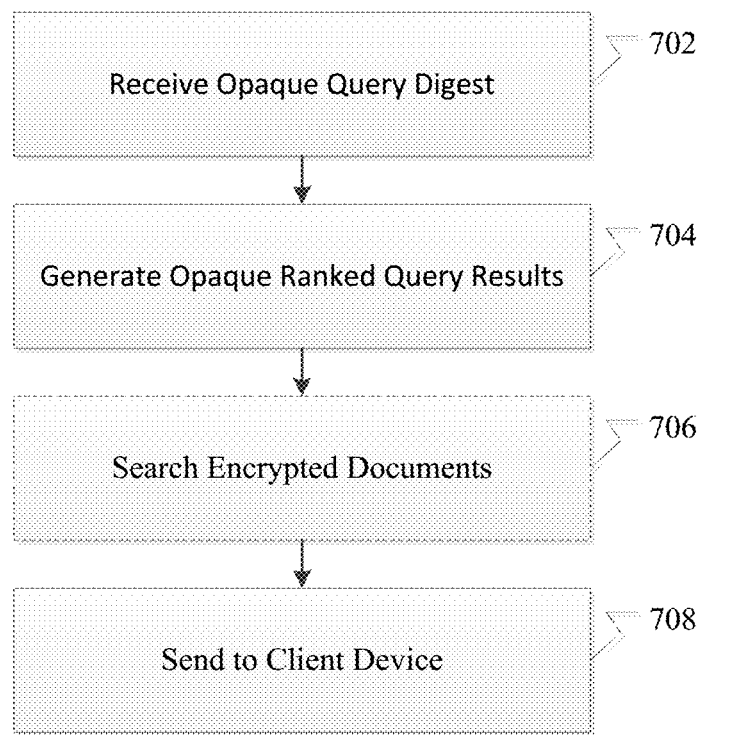
FIG. 7 illustrates an example method of retrieving encrypted documents using a privacy enhanced personal search index for distributed network services as described herein.

FIG. 7 illustrates an example method 700 for retrieving encrypted documents using a privacy enhanced personal search index for distributed network services as described herein. Exemplary method 700 begins at operation 702 where an opaque query digest may be received by a component of a server device of a distributed network system (e.g., cloud services system). The server device may represent an untrusted or partially environment, such that the opaque query digest may not be accessible by the server device or users of the server device.

In operation 704, opaque query results may be generated. In examples, the contents of the opaque query digest may be analyzed and used as input to search a personal search index. The personal search index may comprise opaque data from previously received opaque document digests. In some aspects, the personal search index may also comprise encrypted document snippets from one or more encrypted personal documents. The search of the personal search index may produce opaque query results, which may be ranked according to criteria such as relevance, document age, document size, user profile information, etc. In aspects, the opaque query results may comprise opaque document names and/or identifiers. In one aspect, the opaque query results may alternately or additionally comprise encrypted document snippets. In such an aspect, which may remove document storage from the query workflow, flow proceeds to operation 708.

In optional operation 706, a data store may be searched for encrypted personal documents. In examples, the opaque query results may be provided to a storage management utility. The storage management utility may analyze the opaque query results in order to search a data store for encrypted personal documents and/or document snippets having data (e.g., strings, words, characters, tokens, etc.) that matches the data in the opaque query results. The documents that are found in the data store may be processed for export to a client device.

In operation 708, the opaque query results, encrypted personal documents and encrypted document snippets, or some combination thereof, may be transmitted from the partially trusted or untrusted environment of the server device to the trusted environment of the client device.

Figure 8:
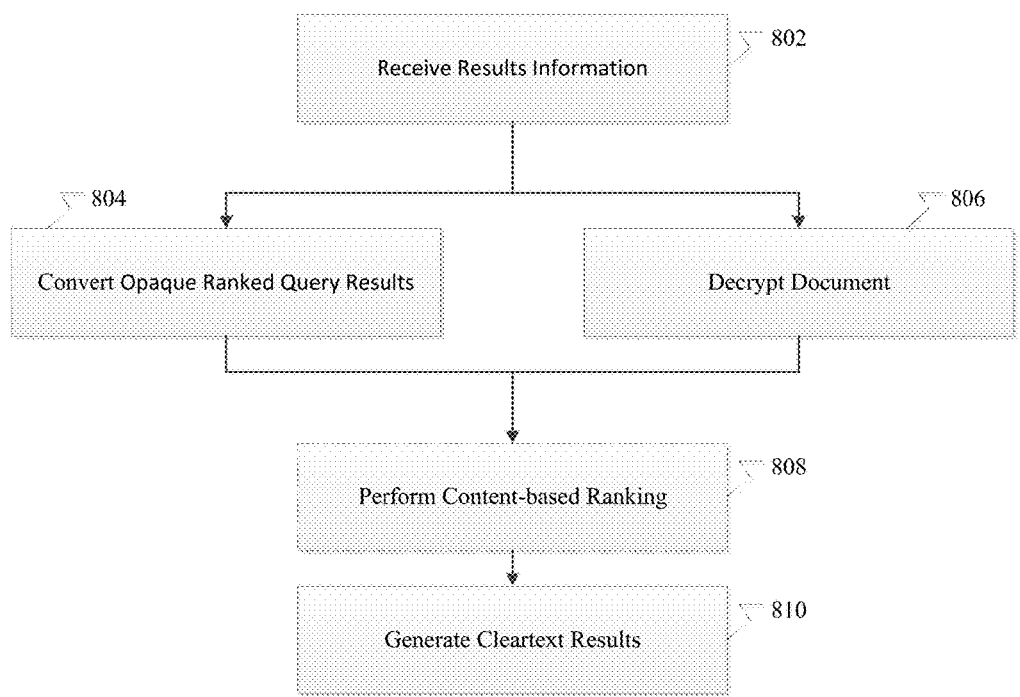
FIG. 8 illustrates an example method of generating cleartext search results using a privacy enhanced personal search index for distributed network services as described herein.

FIG. 8 illustrates an example method 800 of generating cleartext search results using a privacy enhanced personal search index for distributed network services as described herein. Exemplary method 800 begins at operation 802 where query results information may be received by a component of a client device. The query results information may comprise opaque query results, encrypted personal documents and encrypted document snippets.

In operation 804, the opaque query results may be converted. In examples, a PTK accessible to the client device may be used to convert the opaque query results into cleartext query results. The PTK may be same PTK applied to the cleartext document digest and the cleartext query digest as described in FIG. 4A. Operations 802 and 804 may be performed sequentially or in parallel.

In operation 806, the encrypted documents may de decrypted. In examples, the encrypted personal documents and/or encrypted document snippets may be decrypted using a PDK accessible to the client device. In some aspects, the PDK applied to decrypt the encrypted personal documents may be the same PDK applied to the cleartext personal document and/or the document snippets as described in FIG. 4B.

In optional operation 808, the personal documents are ranked. In examples, a ranking process may be associated with the client device. The ranking process may apply the cleartext query results with the cleartext personal document and/or cleartext document snippets. In some aspects, the cleartext personal documents may be ranked according to several criteria (e.g., document content, description, age, size, rarity), such that the most relevant documents may be positioned higher on the result list or may be otherwise graphically delineated from the less relevant documents.

In operation 810, ranked cleartext search results may be generated. In some examples, the ranking process described in operation 808 may produce a file comprising ranked query results. The file may then be matched with the respective documents or document snippets referenced in the file to create ranked cleartext search results. In other examples, where ranking operation 808 was not performed, the cleartext query results may be applied to cleartext personal documents and/or cleartext document snippets, such that cleartext search results are generated. The cleartext search results may not be ranked in a particular order. In aspects, cleartext search results may comprise cleartext documents and/or document snippets (or links thereto).

Figure 9:
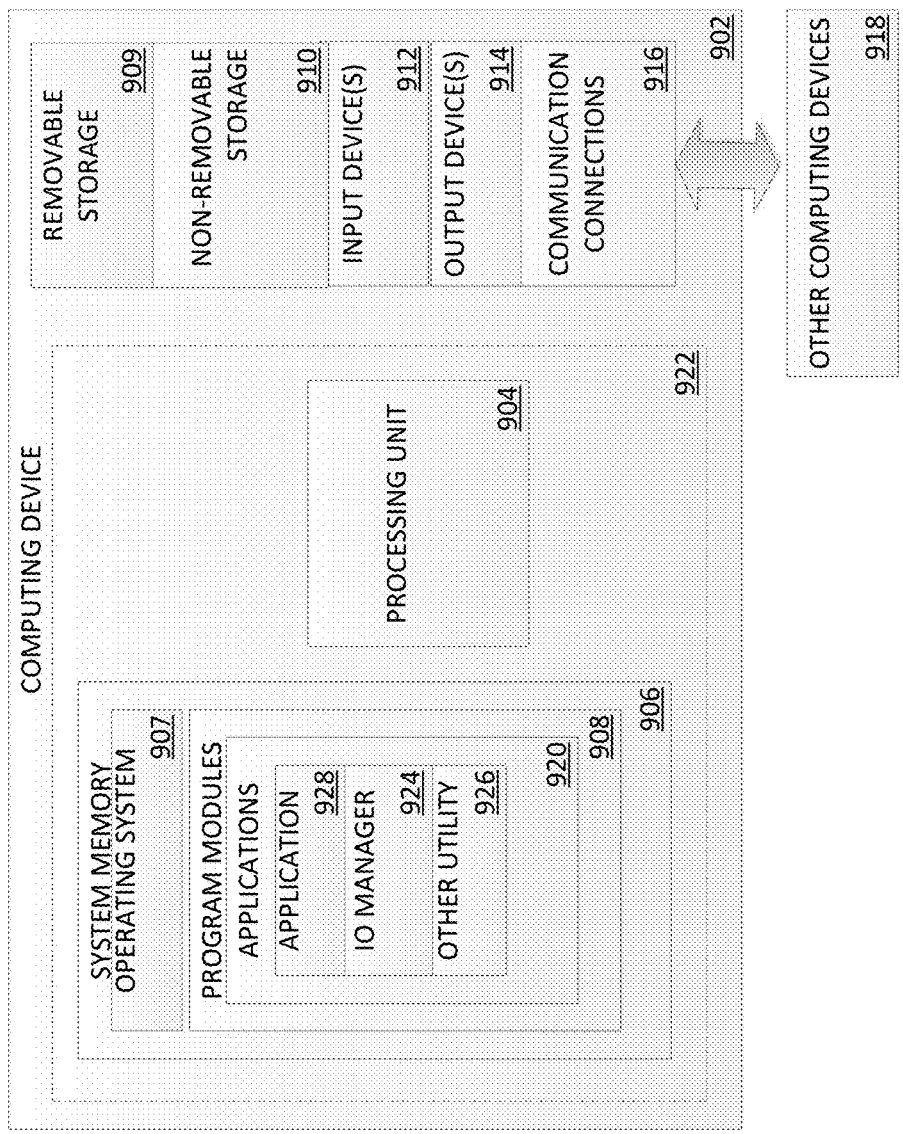
FIG. 9 is a block diagram illustrating an example of a computing device with which aspects of the present disclosure may be practiced.
Figure 10A:
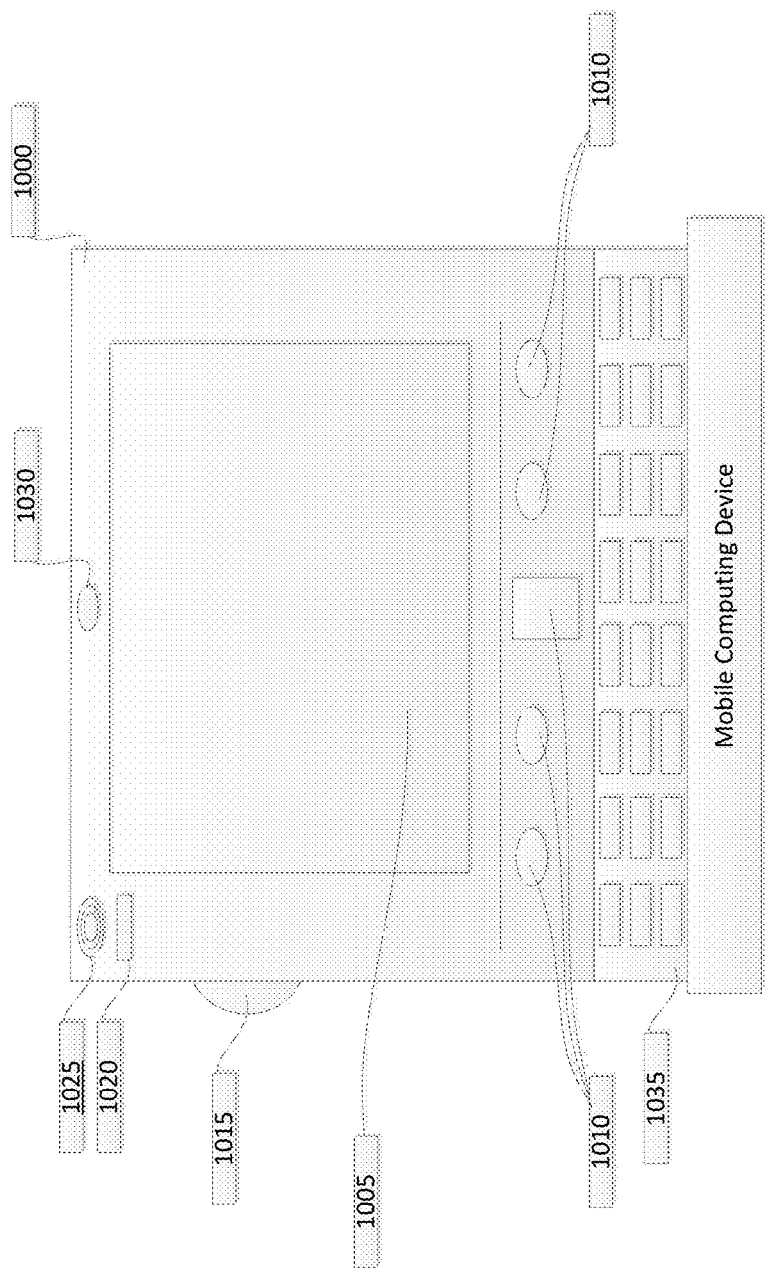
FIGS. 10A and 10B are simplified block diagrams of a mobile computing device with which aspects of the present disclosure may be practiced.
Figure 10B:
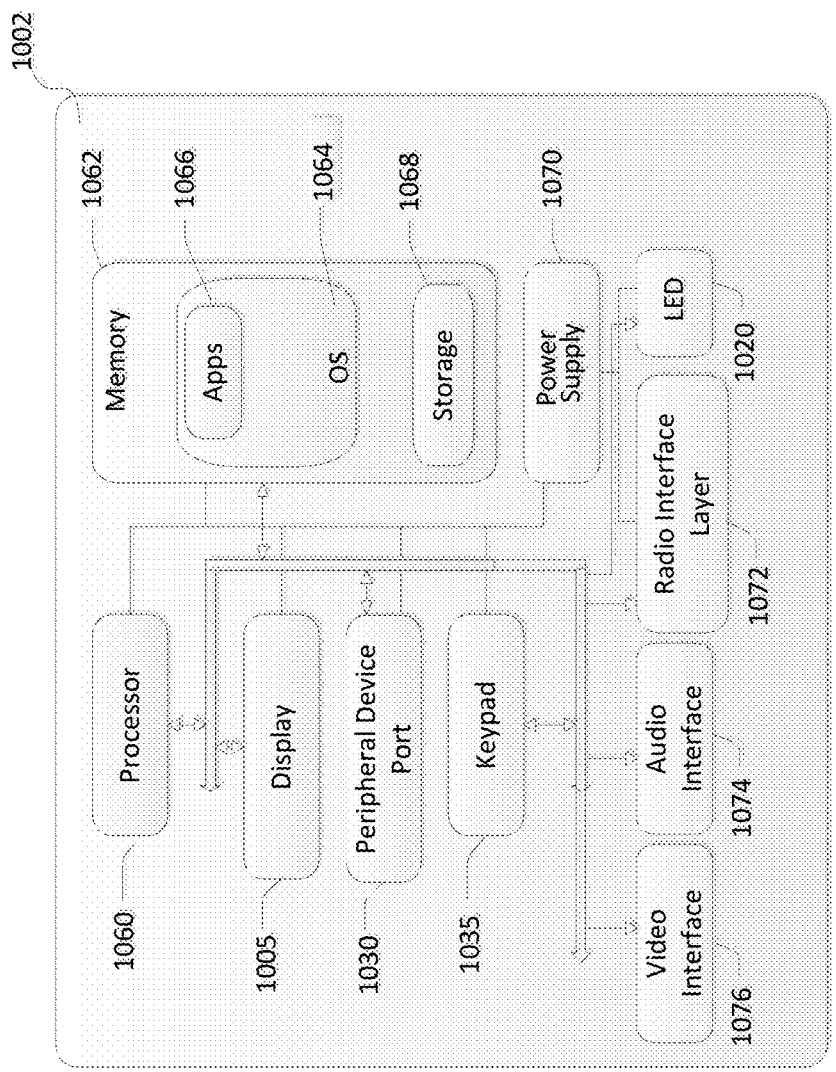
Figure 11:
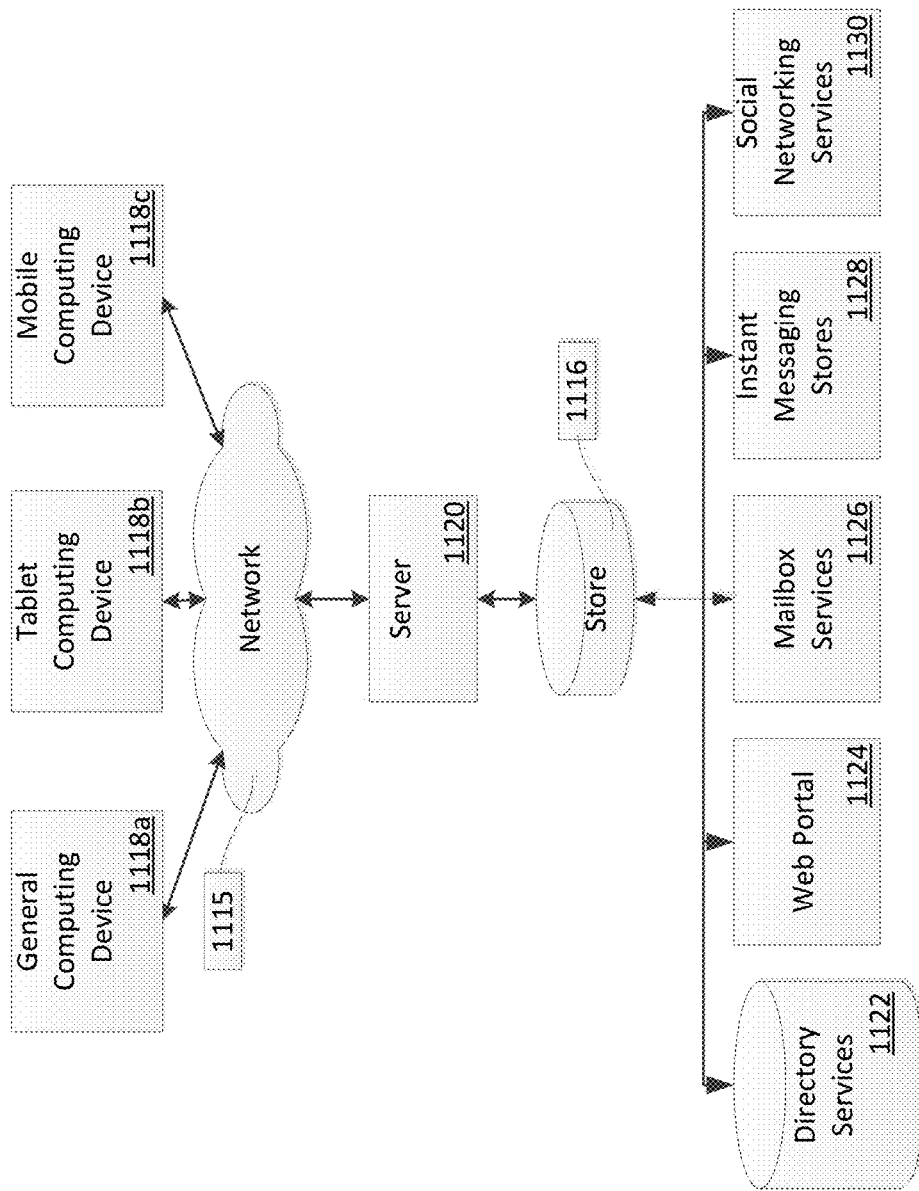
FIG. 11 is a simplified block diagram of a distributed computing system in which aspects of the present disclosure may be practiced.

FIGS. 9-11 and the associated descriptions provide a discussion of a variety of operating environments in which examples of the invention may be practiced. However, the devices and systems illustrated and discussed with respect to FIGS. 9-11 are for purposes of example and illustration and are not limiting of a vast number of computing device configurations that may be utilized for practicing examples of the invention, described herein.

FIG. 9 is a block diagram illustrating physical components of a computing device 902, for example a component of a system with which examples of the present disclosure may be practiced. The computing device components described below may be suitable for the computing devices described above. In a basic configuration, the computing device 902 may include at least one processing unit 904 and a system memory 906. Depending on the configuration and type of computing device, the system memory 906 may comprise, but is not limited to, volatile storage (e.g., random access memory), non-volatile storage (e.g., read-only memory), flash memory, or any combination of such memories. The system memory 906 may include an operating system 907 and one or more program modules 908 suitable for running software applications 920 such as application 928, IO manager 924, and other utility 926. As examples, system memory 906 may store instructions for execution. Other examples of system memory 906 may be components such as a knowledge resource or learned program pool, as examples. The operating system 907, for example, may be suitable for controlling the operation of the computing device 902. Furthermore, examples of the invention may be practiced in conjunction with a graphics library, other operating systems, or any other application program and is not limited to any particular application or system. This basic configuration is illustrated in FIG. 9 by those components within a dashed line 922. The computing device 902 may have additional features or functionality. For example, the computing device 902 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 906. While executing on the processing unit 904, the program modules 908 (e.g., application 928, Input/Output (I/O) manager 924, and other utility 926) may perform processes including, but not limited to, one or more of the stages of the operational method 400 illustrated in FIG. 4, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 902 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 902 may also have one or more input device(s) 912 such as a keyboard, a mouse, a pen, a sound input device, a device for voice input/recognition, a touch input device, etc. The output device(s) 914 such as a display, speakers, a printer, etc. may also be included. The aforementioned devices are examples and others may be used. The computing device 904 may include one or more communication connections 916 allowing communications with other computing devices 918. Examples of suitable communication connections 916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 906, the removable storage device 909, and the non-removable storage device 910 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 902. Any such computer storage media may be part of the computing device 902. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1000, for example, a mobile telephone, a smart phone, a personal data assistant, a tablet personal computer, a laptop computer, and the like, with which examples of the invention may be practiced. For example, mobile computing device 1000 may be implemented as system 100, components of systems 100 may be configured to execute processing methods as described in FIG. 4, among other examples. With reference to FIG. 10A, one example of a mobile computing device 1000 for implementing the examples is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative examples, mobile computing device 1000 may incorporate more or less input elements. For example, the display 1005 may not be a touch screen in some examples. In yet another alternative example, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various examples, the output elements include the display 1005 for showing a graphical user interface (GUI), a visual indicator 1020 (e.g., a light emitting diode), and/or an audio transducer 1025 (e.g., a speaker). In some examples, the mobile computing device 1000 incorporates a vibration transducer for providing the user with tactile feedback. In yet another example, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one example of a mobile computing device. That is, the mobile computing device 1000 can incorporate a system (i.e., an architecture) 1002 to implement some examples. In examples, the system 1002 is implemented as a "smart phone" capable of running one or more applications (e.g., browser, e-mail, input processing, calendaring, contact managers, messaging clients, games, and media clients/players). In some examples, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including application 928, IO manager 924, and other utility 926 described herein.

The system 1002 has a power supply 1070, which may be implemented as one or more batteries. The power supply 1070 might further include an external power source, such as an AC adapter or a powered docking cradle that supplements or recharges the batteries.

The system 1002 may include peripheral device port 1078 that performs the function of facilitating connectivity between system 1002 and one or more peripheral devices. Transmissions to and from the peripheral device port 1072 are conducted under control of the operating system 1064. In other words, communications received by the peripheral device port 1078 may be disseminated to the application programs 1066 via the operating system 1064, and vice versa.

The system 1002 may also include a radio 1072 that performs the function of transmitting and receiving radio frequency communications. The radio 1072 facilitates wireless connectivity between the system 1002 and the "outside world," via a communications carrier or service provider. Transmissions to and from the radio 1072 are conducted under control of the operating system 1064. In other words, communications received by the radio 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with examples of the present invention, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 illustrates one example of the architecture of a system for providing an application that reliably accesses target data on a storage system and handles communication failures to one or more client devices, as described above. Target data accessed, interacted with, or edited in association with application 928, IO manager 924, other utility 926, and storage may be stored in different communication channels or other storage types. For example, various documents may be stored using a directory service 1122, a web portal 1124, a mailbox service 1126, an instant messaging store 1128, or a social networking site 1130, application 928, IO manager 924, other utility 926, and storage systems may use any of these types of systems or the like for enabling data utilization, as described herein. A server 1120 may provide storage system for use by a client operating on general computing device 902 and mobile device(s) 1000 through network 1115. By way of example, network 1115 may comprise the Internet or any other type of local or wide area network, and client nodes may be implemented as a computing device 902 embodied in a personal computer, a tablet computing device, and/or by a mobile computing device 1000 (e.g., a smart phone). Any of these examples of the client computing device 902 or 1000 may obtain content from the store 1116.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system for creating a privacy enhanced personal search index, the system comprising:
    at least one processor; and
    memory coupled to the at least one processor, the memory comprising computer executable instructions that, when executed by the at least one processor, perform a method comprising:
        at a server, receiving an encrypted opaque document digest from a client device, wherein the encrypted opaque document digest is associated with a user;
        at the server, receiving an index key from the client device;
        at the server, decrypting the encrypted opaque document digest with the index key;
        at the server, indexing the decrypted opaque document digest; and
        at the server, creating a user-specific opaque search index using the indexed decrypted opaque document digest, wherein the user-specific opaque search index is personal to the user, and wherein authorized access to the user-specific opaque search index is restricted to the user.

2. The system of claim 1, wherein the method further comprises receiving an encrypted document.

3. The system of claim 2, wherein the decrypted opaque document digest comprises one or more opaque terms and opaque metadata describing the encrypted document.

4. The system of claim 3, wherein the decrypted opaque document digest further comprises document snippets from the encrypted document, wherein the document snippets comprise at least one of:
    a summary of the encrypted document;
    metadata associated with the encrypted document; and
    one or more sentences from the encrypted document.

5. The system of claim 1, wherein a transformation key is used to convert the decrypted opaque document digest to a cleartext document digest.

6. The system of claim 5, wherein the transformation key is not accessible by the system.

7. The system of claim 1, wherein the system is a partially trusted environment, wherein cleartext data associated with the decrypted opaque document digest remains opaque in the partially trusted environment.

8. A system for searching a privacy enhanced personal search index, the system comprising:
    at least one processor; and
    memory coupled to the at least one processor, the memory comprising computer executable instructions that, when executed by the at least one processor, perform a method comprising:
        at a server device, receiving an opaque query digest from a client device, comprising at least one opaque term associated with a user;
        at the server, receiving an index key from the client device;
        at the server, decrypting the encrypted opaque document digest with the index key;
        at the server, indexing the decrypted opaque document digest; and
        at the server, creating a user-specific opaque search index using the indexed decrypted opaque document digest, wherein the user-specific opaque search index is personal to the user, and wherein authorized access to the user-specific opaque search index is restricted to the user;
        identifying the at least one opaque term in the user-specific opaque search index;
        retrieving query results from the user-specific opaque search index;
        ranking the query results according to a relevance of the at least one opaque term to create ranked query results; and
        transmitting the ranked query results to a processing device associated with the user.

9. The system of claim 8, wherein the method further comprises:
    using the query results, retrieving an encrypted document from a data store; and
    transmitting the encrypted document to the processing device.

10. The system of claim 9, wherein the system is a partially trusted environment, wherein cleartext data associated with the opaque query digest, the query results and the encrypted document remains opaque in the partially trusted environment.

11. The system of claim 9, wherein the query results comprise at least an opaque document name, wherein the at least opaque document name is provided to a storage management utility that retrieves the encrypted document from the data store.

12. The system of claim 8, wherein the query results comprise:
    the at least one opaque index term; and
    at least one document snippet from at least one of a plurality of encrypted documents.

13. The system of claim 8, wherein the opaque query digest comprises one or more opaque terms and opaque metadata describing a query.

14. The system of claim 13, wherein a transform key was applied to a cleartext query digest to create the opaque query digest.

15. The system of claim 14, wherein an index key was applied to the cleartext query digest to create the opaque query digest.

16. A method for searching a privacy enhanced personal search index, the method comprising:
    at a server, receiving an encrypted opaque document digest from a client device, wherein the encrypted opaque document digest is associated with a user;
    at the server, receiving an index key from the client device;
    at the server, decrypting the encrypted opaque document digest with the index key;
    at the server, indexing the decrypted opaque document digest; and
    at the server, creating a user-specific opaque search index using the indexed decrypted opaque document digest, wherein the user-specific opaque search index is personal to the user, and wherein authorized access to the user-specific opaque search index is restricted to the user;
    at a server, receiving an opaque query digest, wherein the opaque query digest comprises one or more opaque terms associated with a query;
    searching the user-specific opaque search index using the at least one opaque index term, wherein the user-specific opaque search index is personal to the user, and wherein authorized access to the user-specific opaque search index is restricted to the user;

upon identifying the at least one opaque index term in the user-specific opaque search index, retrieving query results from the user-specific opaque search index;

ranking the query results according to a relevance of the at least one opaque term to create ranked query results; and transmitting the ranked query results to the client device.

17. The method of claim 16, wherein the client device executes a trusted environment that is configured to expose cleartext data associated with the ranked query results and the encrypted document.

18. The method of claim 16, wherein the user-specific opaque search index comprises information identifying an encrypted document and at least one of the one or more opaque terms associated with the query.

19. The method of claim 16, the method further comprising:

searching a data store using the at least one opaque index term;

upon identifying the at least one opaque index term in the data store, retrieving an encrypted document associated with the at least one opaque index term, wherein a document key was applied to a cleartext document to create the encrypted document, wherein the document key is not accessible by the system; and transmitting the encrypted document to the client device.

\* \* \* \* \*